United States Patent
Buell et al.

(10) Patent No.: US 6,609,585 B2
(45) Date of Patent: Aug. 26, 2003

(54) MOTORCYCLE SWINGARM HAVING INTEGRAL OIL STORAGE COMPARTMENT AND CALIPER MOUNTING

(75) Inventors: Erik F. Buell, Mukwonago, WI (US); Dane J. Hoechst, Elkhorn, WI (US); Christopher L. Fiorini, Burlington, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 10/241,204

(22) Filed: Sep. 11, 2002

(65) Prior Publication Data

US 2003/0015366 A1 Jan. 23, 2003

Related U.S. Application Data

(63) Continuation of application No. 09/901,492, filed on Jul. 9, 2001, now Pat. No. 6,516,910.

(51) Int. Cl.[7] .............................................. B62D 61/02
(52) U.S. Cl. ...................................................... 180/227
(58) Field of Search ................................ 180/219, 225, 180/227

(56) References Cited

U.S. PATENT DOCUMENTS

| 5,964,312 A | 10/1999 | Maldonado |
| 5,992,587 A | 11/1999 | Maldonado |
| 6,367,255 B1 | 4/2002 | Gogo et al. |

Primary Examiner—Lesley D. Morris
Assistant Examiner—Matthew Luby
(74) Attorney, Agent, or Firm—Michael Best & Friedrich LLP

(57) ABSTRACT

A motorcycle comprising a frame; an engine mounted to the frame; a steering assembly interconnected with the frame; a front wheel rotatably mounted to the steering assembly; a swingarm mounted to the frame, the swingarm including a hollow portion adapted to contain oil for use in the engine; and a rear wheel rotatably mounted to the swingarm. A removable plate closes the hollow portion of the swingarm, and first, second, and third fittings are associated with the plate. An oil breather tube may be interconnected with the first fitting, an oil pickup tube interconnected with the second fitting, and an oil return tube interconnected with the third fitting. A fixed-position caliper mounting boss is provided on the swingarm, and the swingarm includes a fixed axle for the rear wheel such that the caliper is properly spaced with respect to the rear wheel.

6 Claims, 6 Drawing Sheets

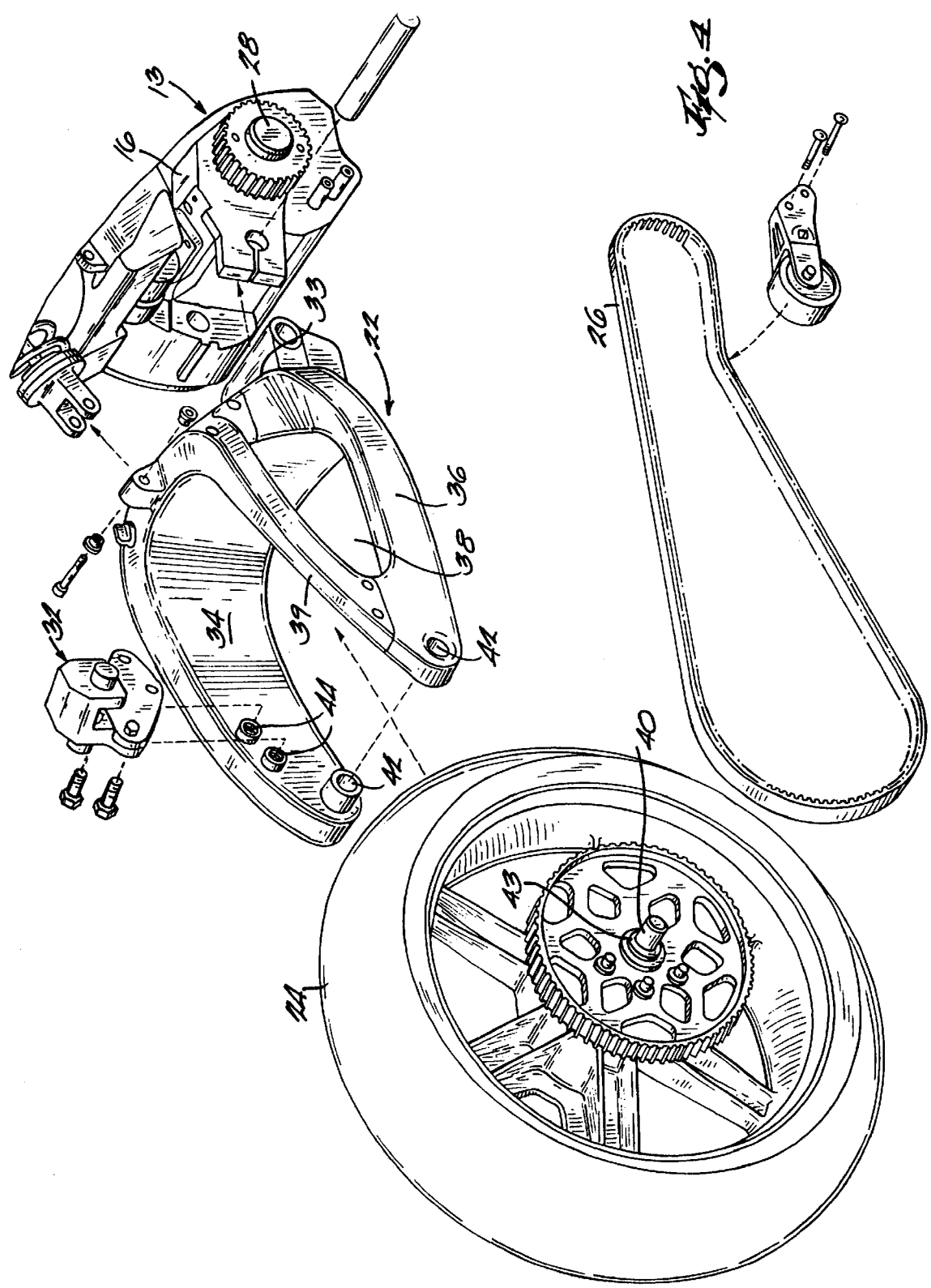

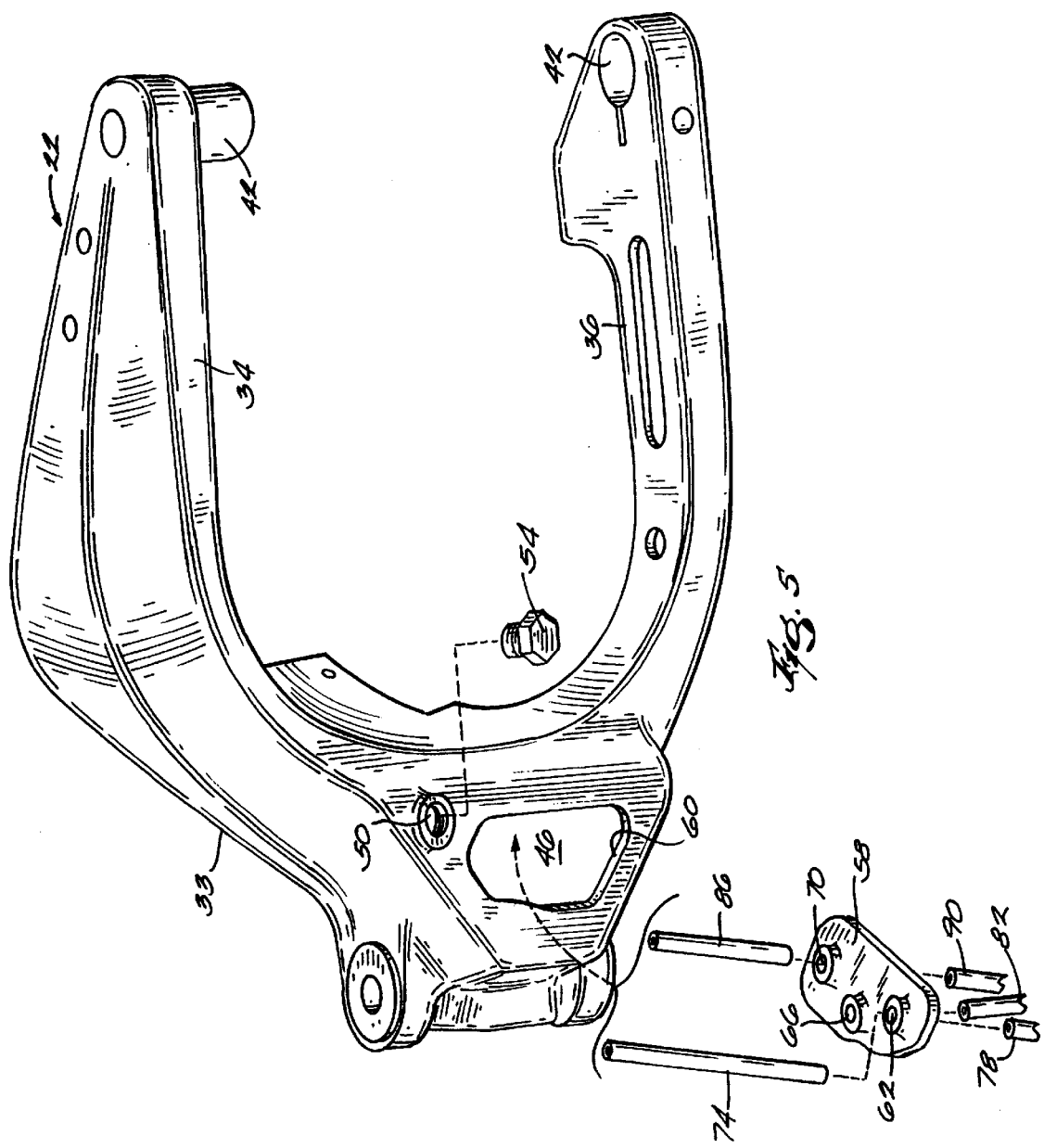

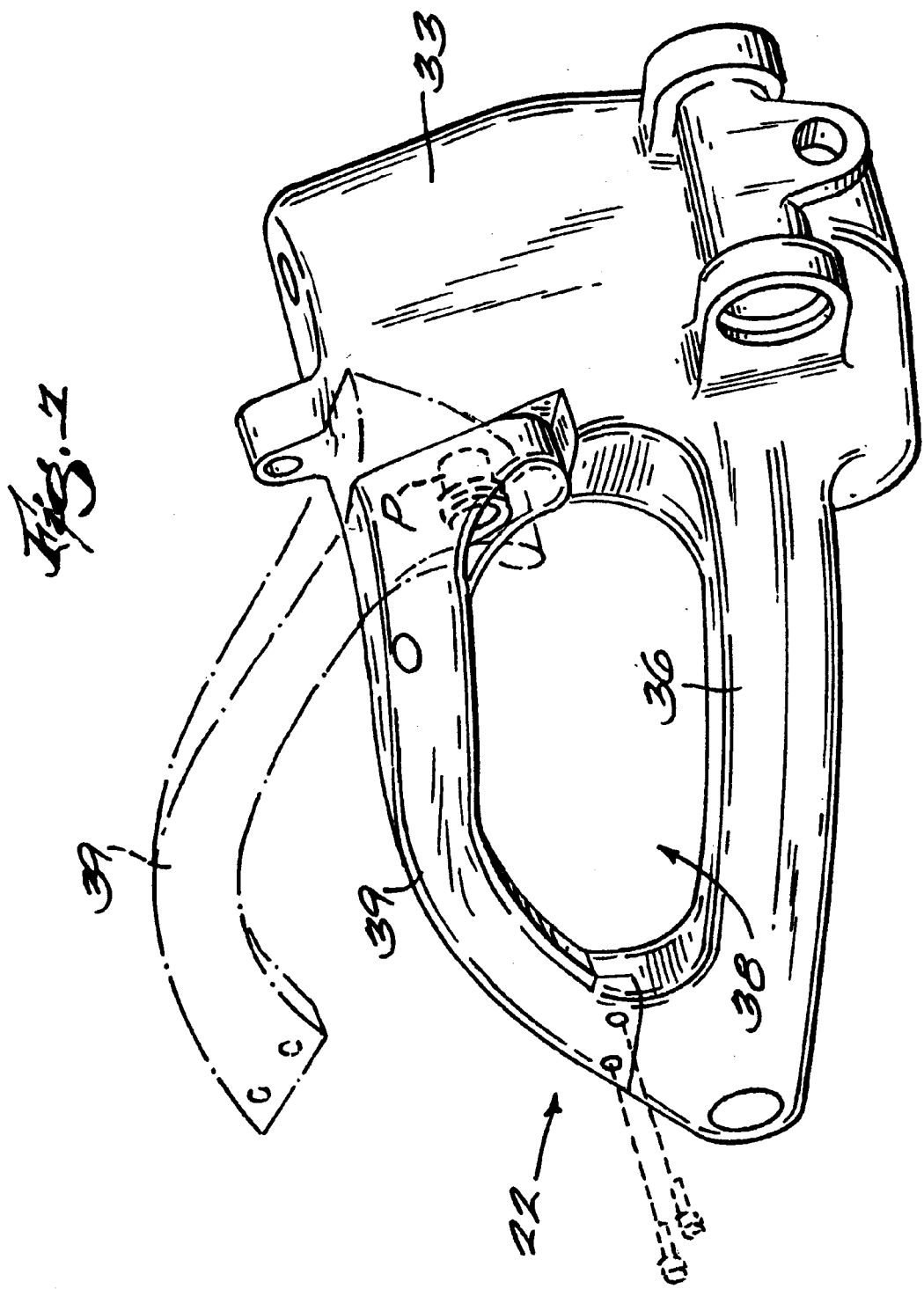

MOTORCYCLE SWINGARM HAVING INTEGRAL OIL STORAGE COMPARTMENT AND CALIPER MOUNTING

CROSS-REFERENCE TO RELATED APPLICATIONS

This application is a continuation of U.S. application Ser. No. 09/901,492, filed Jul. 9, 2001, now U.S. Pat. No. 6,516,910, the entire contents of which are incorporated by reference herein.

BACKGROUND OF THE INVENTION

The invention relates to motorcycle swingarms.

It is known to use a swingarm to interconnect the rear wheel of a motorcycle to the frame of the motorcycle. Typically, the oil for use in the engine of a motorcycle is contained in the crankcase of the engine, or within a separate external oil sump or tank that is mounted to the engine or the frame.

Known motorcycles often include an adjustable rear axle that slides in a slot in the swingarm to adjust the tension in a flexible drive member. The caliper for the rear disc brake assembly is positioned at a fixed distance with respect to the axle and moves with the axle to remain in a functional position relative to a brake rotor.

SUMMARY OF THE INVENTION

The present invention provides a motorcycle including a frame and an engine/transmission assembly mounted to the frame. The motorcycle further includes a front wheel rotatably mounted to the steering assembly. The motorcycle also includes a swingarm pivotably mounted to at least one of the engine/transmission assembly and frame, a rear wheel rotatably mounted to the swingarm, and a flexible drive member coupling the engine/transmission assembly and rear wheel such that the rear wheel is rotated in response to operation of the engine/transmission assembly.

The swingarm preferably includes a hollow portion adapted to contain oil for use in the engine/transmission assembly. At least one conduit communicates between the hollow portion of the swingarm and the engine for the flow of fluid, such as oil or oil-laden air, therebetween. The swingarm preferably defines an opening communicating with the hollow portion, and includes a plate mounted to the swingarm to cover the opening. The plate defines at least one port, and the conduit communicates between the at least one port and the engine/transmission assembly. The at least one conduit may include, for example, a breather tube for the flow of oil-laden air between the engine and the hollow portion of the swingarm.

There is at least one containment wall within the hollow portion of the swingarm. The containment wall defines a boundary of an oil sump within the hollow portion, and functions to contain oil within the oil sump. The oil sump is preferably defined substantially entirely within the front portion of the swingarm.

The swingarm preferably includes first and second sides extending along opposite sides of the rear wheel. The first side defines a drive member aperture therethrough, and a portion of the drive member extends through the drive member aperture. The drive member aperture is closed during normal operation of the motorcycle, but the swingarm includes a removable portion that is removable from the swingarm to open the drive member aperture.

The swingarm preferably includes at least one substantially fixed-position caliper mounting boss. A rear wheel caliper may be mounted to the mounting boss such that the rear wheel caliper is positioned to selectively clamp onto a portion of a brake rotor. The fixed-position caliper mounting boss is preferably located on a surface of the swingarm facing the rear wheel. Further, the rear wheel axle is preferably supported by the swingarm to maintain a substantially constant spacing between the rear wheel axle and the rear wheel caliper.

Other features and advantages of the invention will become apparent to those skilled in the art upon review of the following detailed description, claims, and drawings.

BRIEF DESCRIPTION OF THE DRAWINGS

FIG. 4 is an exploded view of the rear portion of the motorcycle.

FIG. 5 is an exploded view of the swingarm.

FIG. 7 is a perspective view of an alternative construction of the swingarm.

Figure 1:
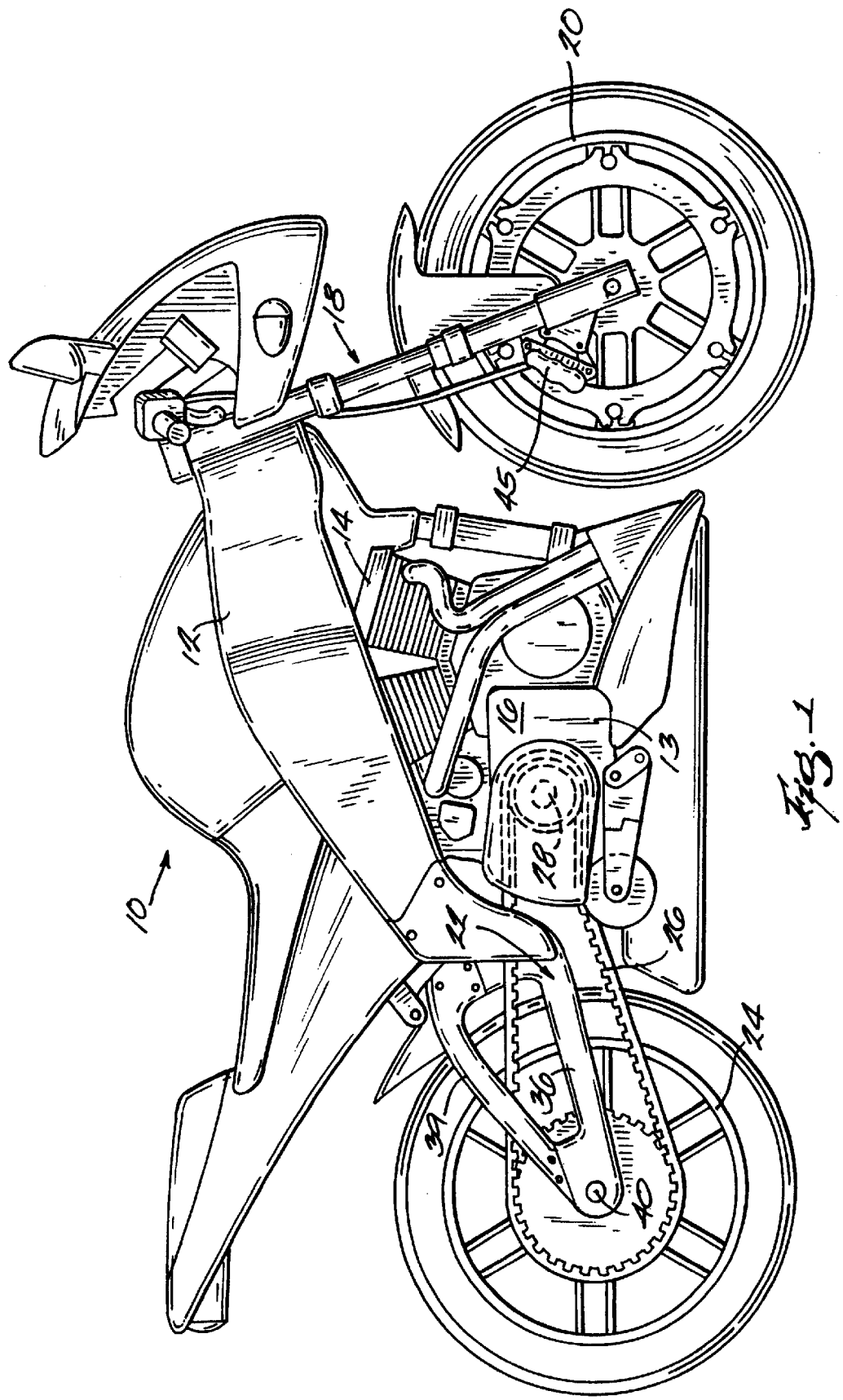
FIG. 1 is a side view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE ILLUSTRATED EMBODIMENT

Figure 2:
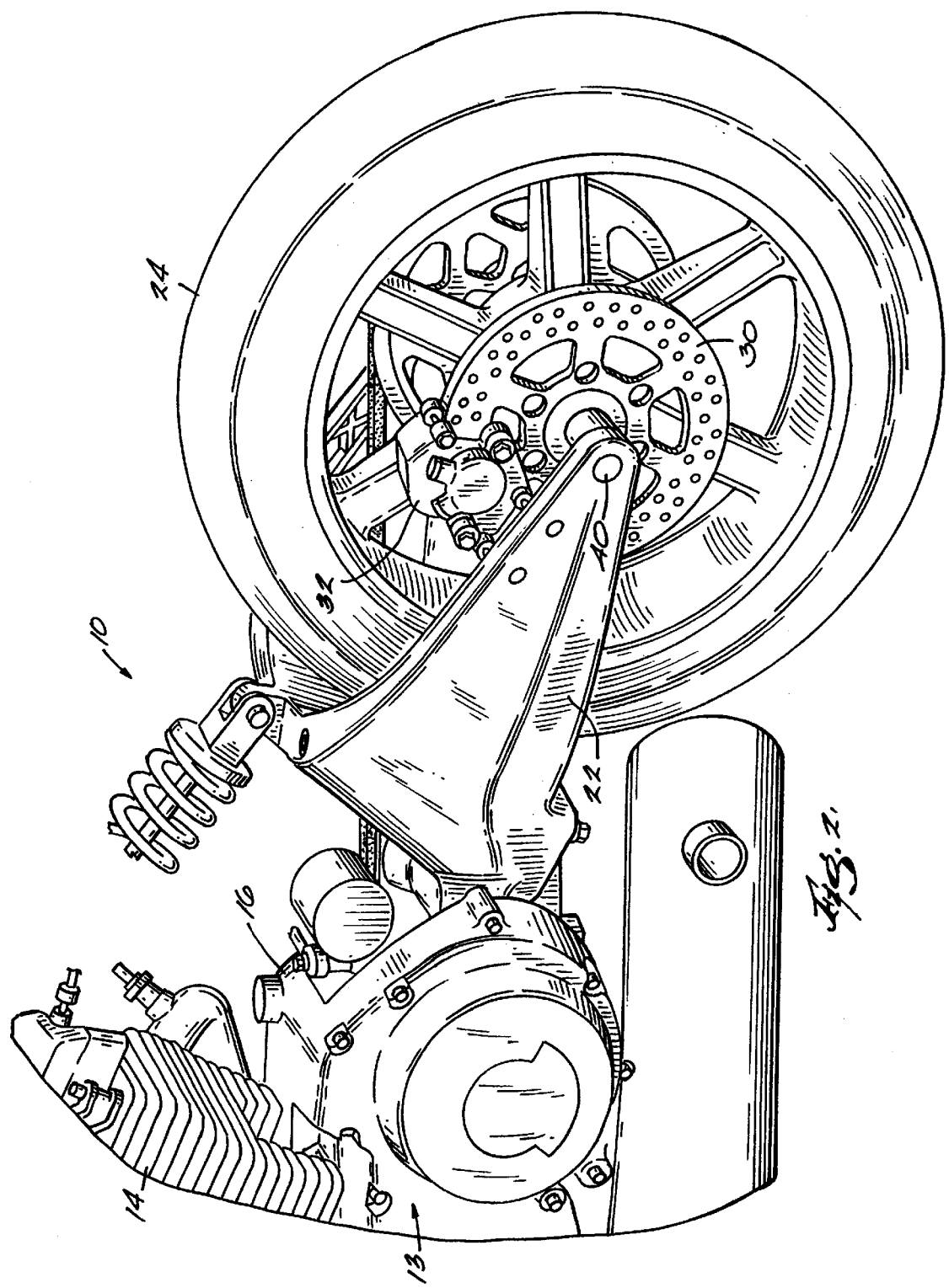
FIG. 2 is a left rear perspective view of the motorcycle with portions removed for the purpose of illustration.

FIGS. 1 and 2 illustrate a motorcycle 10 that includes a frame 12 and an engine/transmission assembly 13 connected to the frame 12. The engine/transmission assembly 13 includes an engine 14 and a transmission 16 connected to the engine 14. The engine 14 and the transmission 16 of the engine/transmission assembly 13 could either include a single integral housing or separate housings connected together. The motorcycle also includes a steering assembly 18 mounted to the front of the frame 12, a front wheel 20 rotatably mounted to the steering assembly 18 and supporting the front end of the motorcycle 10, a swingarm 22 pivotally interconnected to the transmission 16, or alternatively to the frame 12 and/or the transmission 16, and a rear wheel 24 rotatably mounted to the swingarm 22. A flexible drive member, such as the illustrated drive belt 26 or a conventional chain, interconnects the rear wheel 24 with an output shaft 28 of the transmission 16. A rear brake rotor 30 (FIG. 2) is mounted to the rear wheel 24, and a caliper 32 is used to clamp onto right and left faces of the rear brake rotor 30 and slow the rotation of the rear wheel 24.

FIGS. 3–6 better illustrate the swingarm 22, which includes a front portion 33, and first and second spaced-apart sides 34, 36 extending rearwardly from the front portion 33. The first side 34 is a closed side and the second side 36 includes a drive member aperture 38 through which the drive belt 26 extends. A portion 39 of the side 36 is removable to open the aperture 38. As used herein with respect to the portion 39, "removable" means that the portion 39 is selectively movable to open and close the drive member aperture 38, whether the portion 39 is completely removed from the rest of the swingarm or not. For example, in the alternative construction illustrated in FIG. 7, the portion 39 is pivotably interconnected with the rest of the swingarm 22 with a pin or other pivot member P. The portion 39 is pivotable to an open position shown in phantom wherein the aperture 38 is open. The portion 39 in FIG. 7 is still considered "removable" with respect to the swingarm because it is selectively movable to open and close the aperture 38. It should also be noted that the entire portion 39 need not be pivoted, but only a portion sufficient to open the aperture 38 enough to permit removal and replacement of the belt 26.

The rear wheel axle 40 is supported in apertures 42 in the swingarm 22 and is not adjustable with respect to the swingarm 22. The rear wheel 24 is mounted to the rear wheel axle 40 by way of bearings 43 (FIG. 4) such that the wheel 24 rotates about the rear wheel axle 40.

As best seen in FIG. 4, the caliper 32 is mounted to a pair of mounting bosses 44 interconnected with the swingarm 2 at fixed locations on a surface of the closed side 34 facing the rear wheel 24. The caliper could alternatively be mounted on the top, bottom, or any other surface of the swingarm. The rear heel axle 40 and caliper 32 are termed "fixed-position" components with respect to the swingarm 22 because they are do not require any repositioning. Because both the rear wheel axle 4 and the caliper 32 are fixed position components, the spacing between the axle 40 and the caliper 32 is maintained constant. Therefore, provided the correct diameter rotor 30 is used, the caliper 32 automatically positioned with the edge of the rear brake rotor 30 even after the rear wheel 24 and rotor 30 have been removed and replaced. However, the caliper 32 or the mounting bosses 44 may allow minor adjustments to reposition the caliper 32 with respect to the rotor 30 in order to optimize the braking performance of the caliper 32. For example, the mounting bosses 44 may take the shape of elongated slots that permit some fine adjustment o the caliper 32 with respect to the rotor 30.

It should be appreciated that, while the illustrated caliper 32 clamps onto the left and right faces of the rotor from the outer edge of the illustrated rotor 30 and the illustrated rotor 30 is mounted to the hub of the rear wheel 24, a so-called inside-out disc brake assembly may be employed. Such an inside-out disc brake assembly would include a ring-shaped rotor mounted to the wheel rim or to one or more spokes, and a caliper that clamps onto the left and right faces of the rotor from the inner edge of the ring-shaped rotor. An example of an inside-out disc brake assembly 45 is illustrated on the front wheel 20 in FIG. 1.

Figure 3:
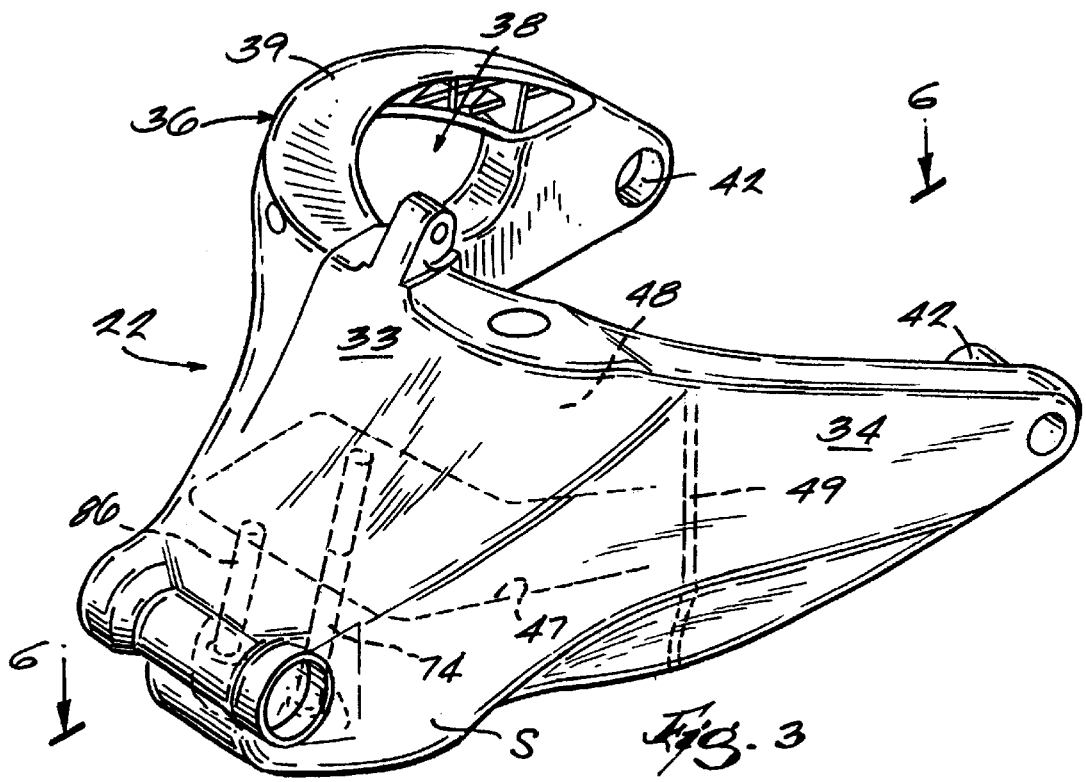
FIG. 3 is a perspective view of the swingarm of the motorcycle.
Figure 6:
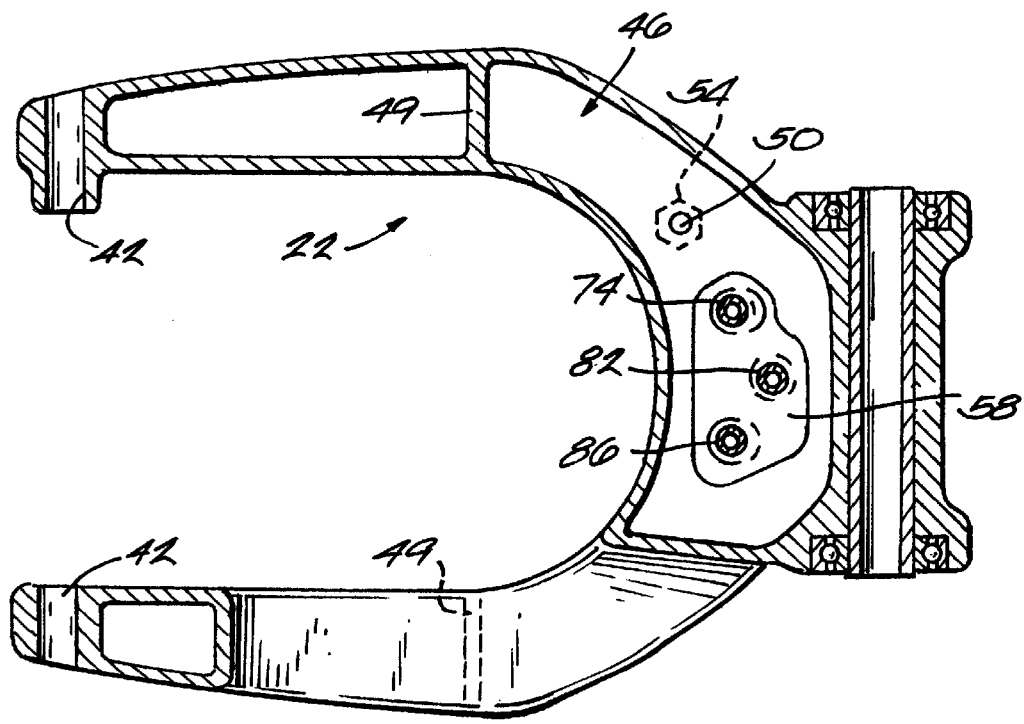
FIG. 6 is a cross-section view taken along line 6—6 in FIG. 3.

As seen in FIGS. 5 and 6, the front of the swingarm 22 and portions of the sides 34, 36 define a hollow portion 46, a front portion of which acts as an oil sump S for containing oil for the engine 14. As shown in FIG. 3, oil fills the hollow portion 46 up to a fill line 47, and a breather portion 48 is defined above the oil within the hollow portion 46. Containment walls 49 are defined within the closed side 34 and the lower portion of the side 36 to prevent oil from sloshing the entire length of the swingarm 22 during operation of the motorcycle 10. The containment wall 49 therefore partially defines the oil sump S within the hollow portion 46. The oil sump S is substantially entirely defined within the front portion of the swingarm 22.

An oil drain hole 50 extends through the bottom of the swingarm and communicates with the hollow portion 46. A drain plug 54 may be employed to close the drain hole 50 during operation of the motorcycle 10.

An oil fitting plate 58 covers an opening 60 at the bottom of the swingarm 22, and includes three holes or ports 62, 66, 70. The first hole 62 communicates with a breather fitting 74 that extends near the top of the sump S and communicates with the breather portion 48. A breather tube 78 from the engine 14 communicates with the breather fitting 74 through the first hole 62 for the flow of oil-laden air from the engine 14 to the breather portion 48. The second hole 66 communicates with an oil supply tube 82 and supplies oil from the bottom of the sump S to the engine 14.

The third hole 70 communicates with an oil return fitting 86 that extends into the sump S. An oil return tube 90 communicates with the oil return fitting 86 through the third hole 70. The oil return tube 90 returns hot oil from the engine to the hollow portion 46. Because the oil return fitting 86 deposits the oil near the oil line 47, the oil is given the opportunity to de-foam and cool before returning to the engine 14 through the second hole 66 and oil supply tube 82.

It should be noted that although separate fittings 74, 86 are illustrated, the tubes 78, 90 could alternatively be extended up through the respective holes 62, 70 to the appropriate heights to function as the fittings 74, 86. In any event, a sealing gasket or grommet may be employed in each hole 62, 66, 70 to eliminate oil leakage from the oil sump.

What is claimed is:

1. A motorcycle comprising:

a frame;

an engine/transmission assembly mounted to said frame;

a steering assembly interconnected with said frame;

a front wheel rotatably mounted to said steering assembly;

a swingarm mounted for pivoting relative to said frame said swingarm including a fixed-position caliper mounting boss;

an axle mounted to said swingarm;

a rear wheel rotatably mounted to said axle;

a flexible drive member coupling said engine/transmission assembly and rear wheel such that said rear wheel is rotated in response to operation of said engine/transmission assembly;

a brake rotor mounted to said rear wheel; and a caliper mounted to said swingarm at said caliper mounting boss, wherein said caliper is not directly mounted to said axle, said caliper selectively clamping said brake rotor to slow down the rotation of said rear wheel.

2. The motorcycle of claim 1, wherein said caliper mounting boss is located on a surface of said swingarm facing said rear wheel.

3. The motorcycle of claim 1, wherein said swingarm defines at least one fixed-position aperture for supporting said axle at a fixed position on said swingarm to maintain a substantially constant spacing between said axle and said caliper.

4. A motorcycle swingarm assembly comprising:

a swingarm including
- a front portion adapted to be pivotably mounted to a portion of a motorcycle,
- at least one side extending rearwardly from said front portion, and adapted to extend along a side of a rear motorcycle wheel; and
- a fixed-position caliper mounting boss located at one of said front portion, and said side of said swingarm, an axle mounted to said swingarm; and a caliper secured to said fixed-position caliper mounting boss and not directly mounted to said axle.

5. The swingarm of claim 4, further comprising at least one fixed position aperture adapted to support said axle at a fixed position and to maintain a fixed and non-adjustable spacing between said axle and said caliper.

6. The swingarm of claim 4, wherein said caliper mounting boss is located on said side of said swingarm.

* * * * *

UNITED STATES PATENT AND TRADEMARK OFFICE
CERTIFICATE OF CORRECTION

PATENT NO. : 6,609,585 B2
DATED : August 26, 2003
INVENTOR(S) : Erik F. Buell, Dane J. Hoechst and Christopher L. Fiorini It is certified that error appears in the above-identified patent and that said Letters Patent is hereby corrected as shown below:

Column 3,
Line 29, "swimgarm 2" should read -- swingarm 22 --.
Line 33, "heel" should read -- wheel --.
Line 36, "axle 4" should read -- axle 40 --.
Line 47, "adjustment o" should read -- adjustment of --.

Signed and Sealed this

Eighteenth Day of November, 2003

JAMES E. ROGAN
*Director of the United States Patent and Trademark Office*